United States Patent [19]

Howe

[11] 4,377,099
[45] Mar. 22, 1983

[54] MODULAR TABLE SAW

[76] Inventor: George E. Howe, 3685 Blue Star Hwy., Hamilton, Mich. 49419

[21] Appl. No.: 241,904

[22] Filed: Mar. 9, 1981

[51] Int. Cl.³ ................................................ B27B 5/22
[52] U.S. Cl. ................................ 83/467 R; 83/477.2; 83/648; 83/859
[58] Field of Search ...................... 83/467, 468, 471.2, 83/471.3, 477.2, 648, 859

[56] References Cited

U.S. PATENT DOCUMENTS

| | | | |
|---|---|---|---|
| 2,810,412 | 10/1957 | Roug . | |
| 3,342,226 | 9/1967 | Marcoux et al. | 144/286 R |
| 4,068,550 | 1/1978 | Gray et al. | 83/471.2 |
| 4,114,665 | 9/1978 | Decker | 144/286 R |

FOREIGN PATENT DOCUMENTS 236454 4/1960 Australia .

*Primary Examiner*—James M. Meister

*Attorney, Agent, or Firm*—Blanchard, Flynn, Thiel, Boutell & Tanis

[57] ABSTRACT

A portable table assembly for a hand-held portable circular saw of the kind having a base plate and a motor rotated circular saw blade. A boxlike saw table has a substantially planar horizontal top pendently supporting the portable circular saw therebeneath with the blade rising up through a slot in the table top. The upstanding opposite sides of the upstanding rectilinear base of the table supports opposite edges of the table top. A boxlike, open bottom, back-up table is positionable behind the saw table for guiding portions of a workpiece cut by the saw and includes a horizontal top and upstanding rectilinear base with opposite sides supporting opposite edges of the top. Common, separable, knockdown leg units support both tables for use. The back-up table is invertable to nest the saw table therein and therewith to define a storage compartment sized to receive the knocked-down leg units for storage and transportation.

11 Claims, 6 Drawing Figures

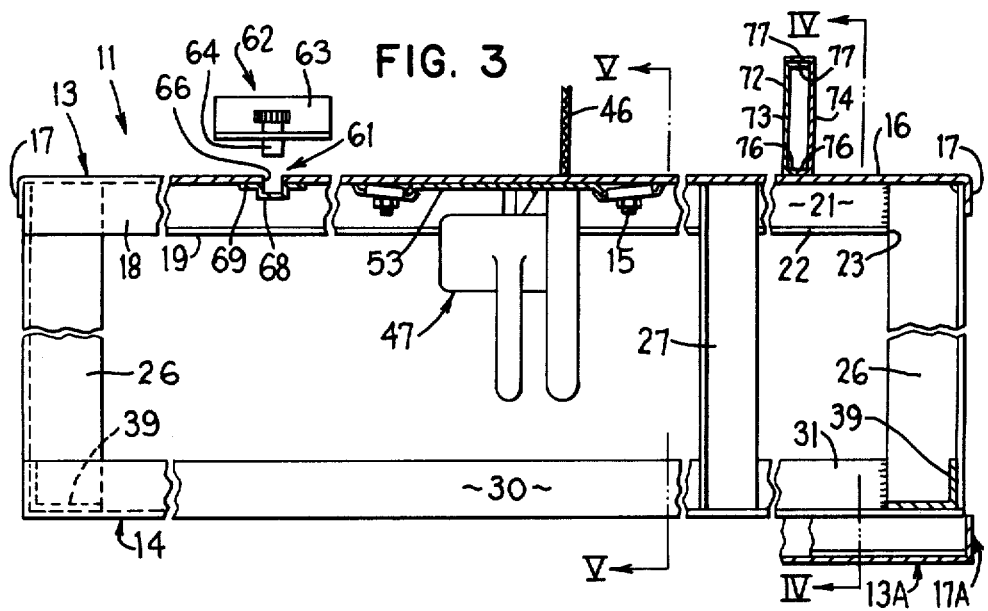
FIG. 3
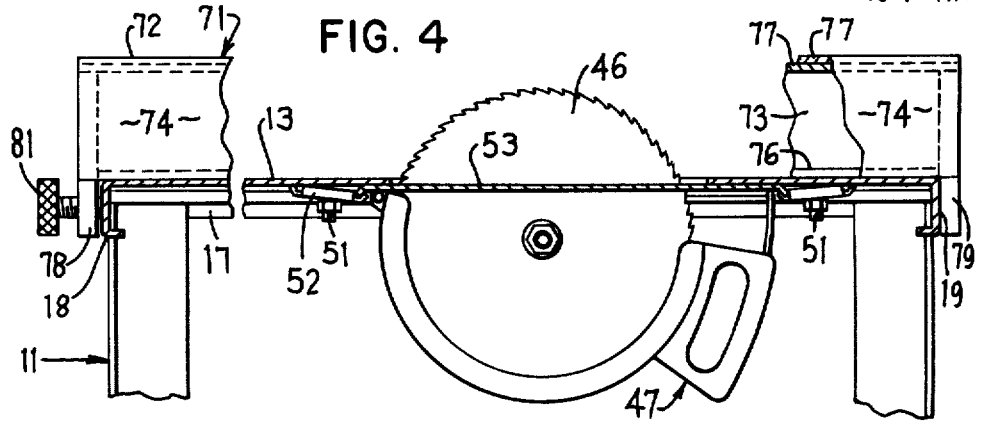
FIG. 4
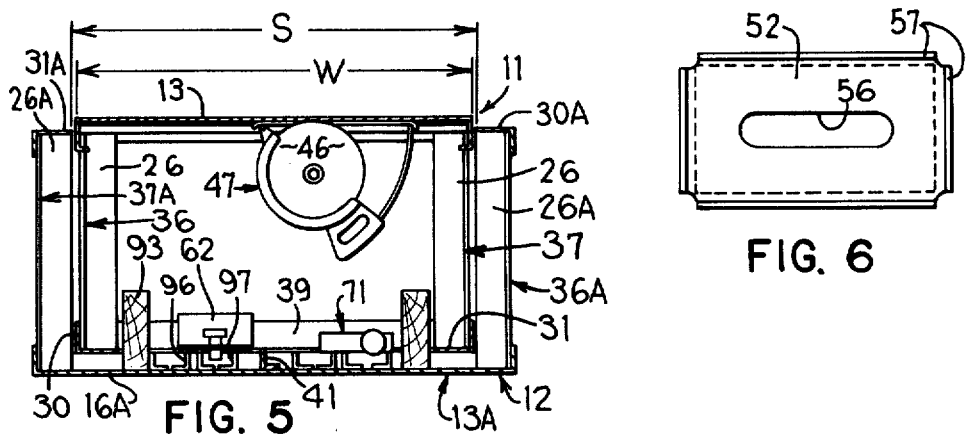
FIG. 5
FIG. 6

MODULAR TABLE SAW

FIELD OF THE INVENTION

This invention relates to a portable table assembly for a hand-held portable circular saw.

BACKGROUND OF THE INVENTION

In residential, light commercial and other types of construction, a carpenter on the job site must make cross-cuts and rip cuts in long pieces of dimension lumber (either construction or finished lumber), often of lengths up to or even exceeding 14 feet, and/or in large area panels, such as conventional plywood or the like building panels which come in sheets up to or beyond four feet wide by eight feet long. These cuts should be accurately made to provide a strong and accurately made building structure and a satisfactory finish appearance.

To supply such bulky stock with the stable support required for accurate and safe cutting has in the past required the use of heavy, bulky, nonportable professional table saws of the type intended to be fixedly installed in a commercial woodworking shop. However, these are entirely unsatisfactory for use on a residential or commercial building or remodeling site because they are too heavy and bulky to be moved about on a job site or to be moved back and forth between a job site and a pickup truck by two men, they are excessively costly, and despite their large size they still normally do not provide a table area of width and length sufficient to comfortably handle and accurately guide large stock such as conventionally sized building panels, particularly if cuts are to be made by one man without an assistant.

To achieve the portability needed for transport around a job site or from job site to job site in a carpenter's pickup or panel truck, compact and lightweight table saws and tables for mounting of electric hand circular saws have been known. However, unless further means are provided, these units are normally not provided with supports capable of supporting the table surface at the normal working height (approximately waist height), and such portable saw tables and thus often placed directly on the floor with the work support surface only a foot or so above the floor, which makes cutting cumbersome and unsafe. Moreover, the table area on such compact table saws or saw tables is generally so small (for example typically less than four square feet) that it is difficult to accurately crosscut or rip substantial lengths of dimension lumber and the rip guide cannot be positioned far enough from the blade to permit many ripping cuts on four by eight foot panels.

Hand-held electric circular saws are widely used by carpenters on residential and commercial building and remodeling sites because of their portability. However, it is difficult to achieve accuracy in cutting either dimension lumber or panels without recourse to accessory guiding devices which tend to be time consuming to use and in many instances cumbersome and unreliable for highly accurate work. These disadvantages are particularly true in the case of large panels which present additional difficulties in supporting of the panel during cutting.

Accordingly, the objects and purposes of this invention include provision of:

A portable table assembly for a hand electric circular saw which supports the saw blade at a convenient working height and provides adequate support and guidance for crosscutting and ripping of long dimension lumber pieces and for conventional panel material, such as four by eight foot sheets of plywood or the like.

An apparatus, as aforesaid, which provides an unusually large area saw table, which in a single table surface provides sufficient width for positioning a rip fence from the blade by more than half the width of a conventional four by eight foot panel from the saw blade, and which provides sufficient fore-aft table width as to permit one man to readily rip long dimension lumber or conventional plywood panels.

An apparatus, as aforesaid, collapsible to form a plurality of units variously nestable and stowable within each other to provide a compact, relatively lightweight, easily transported unitary package, which package can readily be transported by one man and quickly taken down or set up by one man.

An apparatus, as aforesaid, capable of using a wide variety of brands and types of hand electric circular saws, in which the hand circular saw can be readily and quickly mounted or demounted on the apparatus, and in which the hand circular saw may be left mounted on the apparatus when the several units of the latter are in their nested and stowed unitary package condition for transport or storage.

Other objects and purposes of this invention will be apparent to persons acquainted with apparatus of this general type upon reading the following specification and inspecting the accompanying drawings.

SUMMARY OF THE INVENTION

The objects and purposes of the invention are met by providing a portable table assembly for a hand electric circular saw including a boxlike saw table for supporting and guiding a workpiece past the circular saw blade, including a substantially horizontal top supporting the portable saw therebeneath and an upstanding base having opposite sides supporting opposite edges of the top. A boxlike back-up table is positionable behind the saw table and includes a substantially horizontal top and a rectilinear base having upstanding opposite sides supporting opposite edges of the top. One of said bases has an open bottom. Means are provided for supporting the bases of the tables on a common plane with the table tops at a convenient working height. The open bottom of the base of one said table is larger than the base of the other table such that the other table is nestable in the open bottom of the one table.

BRIEF DESCRIPTION OF THE DRAWINGS

FIG. 3 is a fragmentary, partially broken, front view of the saw table of FIG. 1 with a fragment of the top of the back-up table therebeneath as in FIG. 2.

FIG. 4 is a fragmentary, partially broken, side cross-sectional view substantially as taken on the line IV—IV of FIG. 3.

FIG. 5 is a reduced scale side cross-sectional view, substantially as taken on the line V—V of FIG. 3 and showing elements of the apparatus in nested, stowed condition.

FIG. 6 is an enlarged plan view of a clamp member of the kind used for clamping the base plate of the hand circular saw to the underside of the top of the saw table.

DETAILED DESCRIPTION

Figure 1:
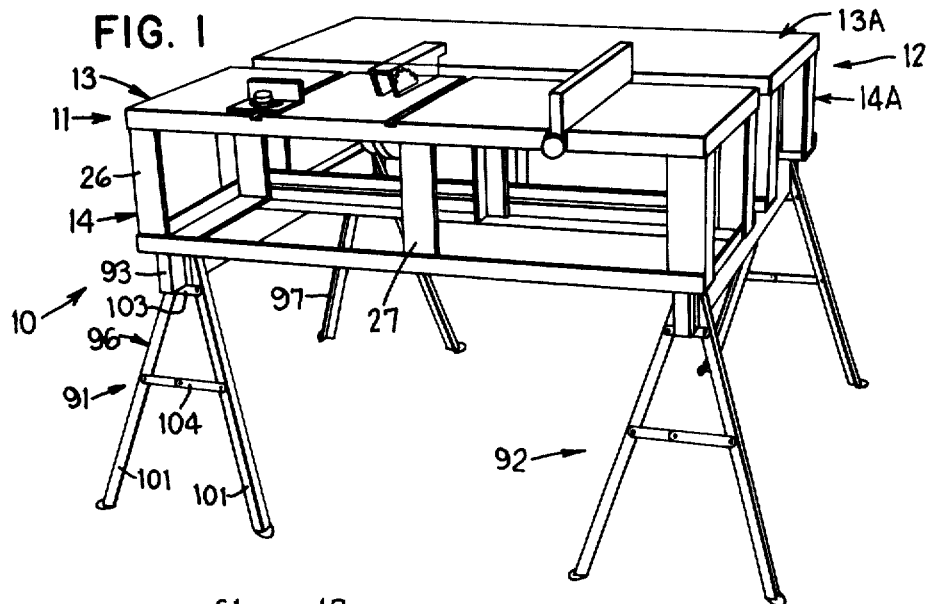
FIG. 1 is a pictorial view of a preferred embodiment of the invention set up for use.
Figure 2:
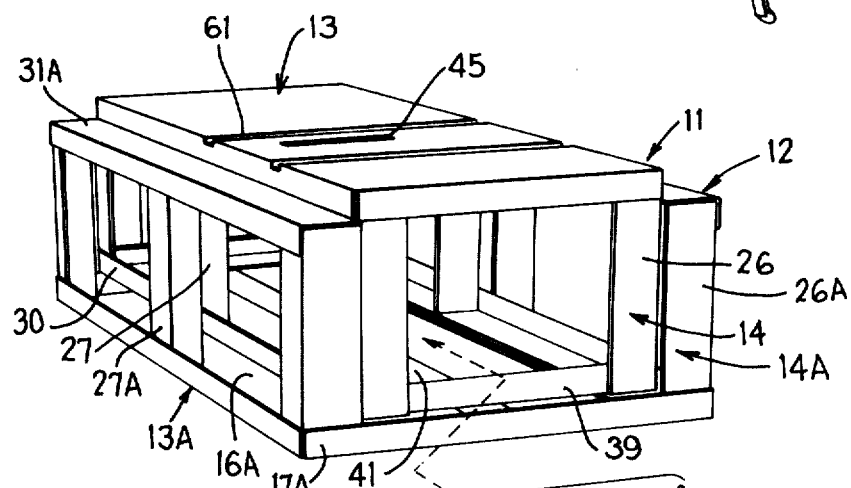
FIG. 2 is an enlarged pictorial view of the FIG. 1 apparatus with its tables nested and its leg units set up for stowage within the nested tables.

The portable table assembly 10 embodying the invention comprises a saw table 11 and a back-up table 12 (FIGS. 1 and 2) shown in a position of use in FIG. 1 and in nested condition for transport and storage in FIGS. 2 and 5.

The saw table 11 comprises a horizontal, substantially planar top 13 supported atop a rectilinear, boxlike base 14. The table 11 is preferably sheet metal. The top 13 comprises a horizontal substantially planar top panel 16 (FIGS. 3 and 4) having depending left and right end flanges 17 and depending substantially L-cross section front and rear flanges 18 and 19. The L-cross section front and rear flanges each comprise a depending lip 21 (FIG. 3) and a reversely bent (or inwardly directed) lip 22, the latter lip being omitted, as at 23, where necessary to permit legs 26 and 27 (hereafter discussed) of the base to lie flush against the interior side of the depending lip 21 of the front and rear flanges 18 and 19.

The base 14 of the saw table comprises four corner legs 26 fixed and depending from respective corners of the top 13, and preferably two intermediate legs 27 depending from the front and rear flanges 18 and 19 near the central portions thereof. The legs 26 and 27 are of L-shaped cross section, support the top panel 16 thereon, and engage and are welded to the interior surfaces of the flanges 17 and depending legs 21 of flanges 18 and 19. Horizontal front and rear base members 30 and 31 are preferably of angle cross section with bottom flanges underlying the bottoms of the legs 26 and 27 and are welded to legs 26 and 27 to provide a rigid base.

As seen in FIG. 5, the base 14 thus has a front side 36 comprising front base member 30 and the legs 26 and 27 upstanding therefrom, and has a rear side comprising the rear base member 31 and the legs 26 and 27 upstanding therefrom.

The back-up table 12 is preferably constructed in the same manner as above discussed with respect to the saw table 11, except for differences hereinafter discussed. Accordingly, corresponding parts of the back-up table 12 will carry the same reference numerals, with the suffix "A" added thereto, as have been used for parts of the saw table 11.

A major difference between the tables is that one, preferably the back-up table 12, is wider in a forward-rearward direction (namely from left to right in FIGS. 1 and 4) than is the other table. In the preferred embodiment then, the width W (FIG. 5) of the saw table 13 is slightly less than the space S between the sides 36A and 37A of the base of the back-up table 12. The back-up table can thus be inverted to receive the saw table in nested relation therein for transportation and storage.

The base 14A of the back-up table 12 is open between the sides 36A and 37A. In contrast, fore-aft base members 39 (FIGS. 2 and 3), preferably of angle cross section, fixedly connect as by welding the bottom corners of the front side 36 to the bottom corners of the rear side 37. This additionally rigidifies the base 14 of the saw table 11. A longitudinal reinforcing member 41 (FIGS. 2, 3 and 5), here of angle cross section, is fixed as by welding centrally to the under side of the top panel 16A of the back-up table and extends from end to end thereof to provide a free edge substantially at the level of the free edges of the flanges 17A of the back-up table top, upon which free edges the base members 39 of the saw table may rest when nested in the inverted back-up table as in FIGS. 2, 3 and 5.

Whereas the top 13A of the back-up table is preferably planar and without interruption, the saw table top 13 is provided with a fore-aft extending saw blade slot 45 (FIGS. 2 and 4) spaced between the front and rear edges of the table 13 for receiving upwardly therethrough the rotatable blade 46 of a hand electric circular saw, or the like, schematically indicated at 47 in FIGS. 3 and 4. Threaded members, such as screws, or preferably threaded studs 51 welded pendently to the underside of the saw table top 13, are provided with nuts tightenable to urge clips 52 to clamp the conventional base plate 53 of the saw 47 to the underside of the saw table top 13 to fixedly but releasably mount the saw 47 pendently from the saw table top, with its blade 46 extending up through the blade slot 45. In the preferred embodiment shown, the clips 52 are rigid sheet metal members having an elongate central stud receiving slot 56 and separate edge flanges 57 (FIG. 6) bent in the same direction out of the plane of the central portion of the clip 52 to conveniently grip edges of the saw base plate 53. Many hand electric circular saws include means for tilting and recessing the blade 56 with respect to the base plate 53 and these functions are retained when the saw is affixed pendently to the saw table top 13. As seen in FIG. 5, more than sufficient space is provided within the confines of the saw table base to fully recess the saw blade 46 beneath the table top 13.

The saw table top also has at least one crosscut guideway 61 (FIG. 3) for fore-aft guiding of a conventional crosscut, or mitre, guide 62 of the kind having a cross head 63 for forwarding stock to crosscut by the saw blade and a rail 64 for supporting such cross head and longitudinally received in the guideway 61 for sliding therealong. In the preferred embodiment shown, the guideway 61 is formed by a fore-aft slot 66 extending the full fore-aft extent of the table top and opening down through the thickness of the saw table top and into the dependent lips of the front and rear flanges 18 and 19. An upwardly opening, channel cross section trough 68 of sheet metal has an inside width equal to the inside width of the slot 66. The trough is aligned with the slot and at its upper edges has outwardly extending horizontal edge flanges 69 which are fixed, preferably by welding, to the underside of the saw table top to form said guideway 61.

A rip fence 71 (FIGS. 3 and 4) is positionable atop the saw table to extend in the fore-aft direction thereacross and is fixedly securable in any desired position widthwise of the saw table 13. In the preferred embodiment shown, the rip fence comprises a hollow rectangular cross section fence member 72 formed of two channel cross section sheet metal members 73 and 74 having relatively short horizontal bottom flanges 76 which are coplanar and have free length edges directly opposed and abutting each other. The channel-shaped portions 73 and 74 have longer horizontal overlapped flanges 77, wherein the top flange 77 of the fence part 74 overlies the top flange 77 of the fence part 73 as seen in FIGS. 3 and 4. The two fence parts 73 and 74 have the fore and aft ends of their bottom flanges 76 cut away to receive upstanding front and rear bars 78 and 79 within the ends of the cavity formed by the channel-shaped side members 73 and 74 of the fence. The bottom portions of such bars 78 and 79 depend to overlap the front and rear flanges of the saw table top 13 in close but laterally slidable relation therewith. The fence channel members 73 and 74 and bars 78 and 79 are rididly fixed to each other, preferably by welding. A hand screw 81 (FIG. 4) is threaded rearwardly into and through the depending portion of the front bar 78. The screw 81 is threadedly tightenable to tightly grip the front and rear edges of the saw table 13 between the inner end of the screw 81 and the rear bar 79 and thus clamp the fence 71 in place in the desired location on the table.

The portable assembly 10 further includes a pair of leg units 91 and 92 (FIG. 1) which preferably are collapsible sawhorses. Each leg unit is a knockdown assembly comprising an on-edge plank 93 (FIGS. 1 and 2) preferably of conventional dimension lumber such as a 2×4, supported at its ends above the ground by conventional foldable A-frame type legs 96 and 97. In the embodiment shown, each leg A-frame 96 or 97 comprises upwardly convergent legs 101 having upper ends which releasably grip the on-edge plank 93. The legs are pivotally connected adjacent their upper ends at 103 to further support the on-edge plank and are connected near their lower ends by a two-link foldable brace 104 having a center pivot and pivotal connections to the legs 101.

The planks 93 are each of length somewhat exceeding the sum of fore-aft widths of the saw table 11 and back-up table 12. Thus, for use, the leg units 91 and 92 are erected and placed side by side with their planks 93 extending in the fore-aft direction, as shown in FIG. 1. The spacing of the leg units 91 is less than the lateral length of the tables 11 and 12. The tables 11 and 12 are placed, the first ahead of the second in the manner shown in FIG. 1, upon the planks 93 of the leg units 91 and 92 and preferably laterally overhangs same somewhat. While not necessary, suitable means such as clamps or bolts may be provided to releasably fix the bases 14 and 14A of the tables 11 and 12 to the leg units 91 and 92. For example, the bottom flanges of ones of the L-shaped base members 30, 31 or 39 of the saw table and corresponding base members of the back-up table may be releasably fixed to the planks 93 of the leg units. Normally however the weight of the tables is sufficient to hold same in place atop the leg units during use.

The crosscut guide 62 and rip fence 71 operate conventionally to guide lumber and panels along the top 13 of the saw table 11 for cutting by the upward extending saw blade 46 (FIGS. 3 and 4). The leg units 93 support the tables 11 and 12 with their tops 13 and 13A coplanar (FIG. 1) so that the panels or elongate lumber being ripped would be supported upon and will slide readily rearwardly across the top 13A of the back-up table 12. The lateral distance between the blade 46 and at least one end (here the rightward end) of the top of the saw table exceeds half the width of the conventional width panels (for example four by eight foot panels) permits the rip fence 71 to be clamped to the saw table top to rip in half such a conventional panel. The lateral lengths of the tables 11 and 12 (from right to left in FIG. 1) are preferably substantially the same so that both provide adequate support for relatively wide workpieces being cut.

To transport or store the portable table in a compact space, such as a portion of the bed of a conventional pickup truck or van, the back-up table 12 is lifted off the leg units 91 and 92 and inverted so that its base 14A opens upward as in FIG. 2. The saw table 13 is then nested within the inverted back-up table also as in FIG. 2. The A-frames of the leg units are then folded to release the planks 93 and are folded to achieve the knocked-down configuration of the leg units as further shown in FIG. 2. The lengths of the elements 93, 96 and 97 of the knocked-down leg units are each less than the length of the tables 11 and 12 such that the knocked-down leg units, along with the rip fence and crosscut guide, are storable within the nested tables, as shown at FIG. 5.

In one embodiment constructed according to the invention, the saw table was about 46 inches long by 20 inches wide, the back-up table was about 46 inches long by 24 inches wide and the height of the tables was about 22 inches. The tables were cut and bent from 16 gauge sheet steel.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a portable table assembly for a hand electric circular saw of the kind having a base plate and a motor rotated circular saw blade, said portable table assembly comprising:

a boxlike saw table for supporting and guiding a workpiece past said saw blade and including a substantially planar horizontal top pendently supporting said portable circular saw therebeneath with a blade slot permitting said blade to rise upwardly through said top and an upstanding rectilinear base having upstanding opposite sides supporting opposite edges of said top;

a boxlike back-up table positionable behind said saw table for guiding portions of said workpiece cut by said saw and including a substantially planar horizontal top and an upstanding rectilinear base having upstanding opposite sides supporting opposite edges of said top, one of said bases having an open bottom;

means for supporting said bases of said tables on a common plane, the heights of said saw table and back-up table being the same so that their tops are coplanar with their bases on said common plane;

said open bottom of said base of one said table being larger than said base of the other said table, said other table being nestable in said one table by reception through the open bottom of the latter.

2. The apparatus of claim 1, in which said back-up table has said open bottom, said sides of said back-up table base being spaced further apart than said sides of said base of said saw table and by an extent sufficient to receive said base of said saw table therebetween.

3. The apparatus of claim 2, in which said back-up table is invertable so that its open bottom opens upward to facilitate downward nested reception therein of said saw table with said saw table upright, the top of said inverted back-up table forming a floor underlying the base of said nested saw table, the thus-nested tables coacting to form a storage compartment closed at the top by said saw table top, closed at the bottom by said back-up table top and closed at opposite sides by adjacent sides of said saw table and inverted back-up table.

4. The apparatus of claim 3, in which corresponding ends of said nested tables are open for access to said storage compartment.

5. The apparatus of claim 4, in which said means for supporting said bases comprise a pair of leg units erectable to support the bases of said table at spaced locations therebeneath, said leg units being knock-down units separable from said tables, said storage compartment being sized to receive said knocked down leg units for storage therein for storage and transportation.

6. The apparatus of claim 2, in which the sides of each of said tables extend transversely and respectively depend from the front and rear edges of the top of the respective table, said back-up table being of inverted generally channel-shaped cross section with its opposite ends and bottom open, said saw table having its top and sides arranged in inverted, substantially channel shape but having forward-rearwardly extending reinforcing members connecting the lower right corners and lower left corners, respectively, of the front and rear side walls, said channel-shaped back-up table being invertable to receive the upright saw table in nested relation between said back-up table sides, said back-up table having means on the under side of the top thereof for contacting and supporting said reinforcing members of said saw table thereon in said nested condition of said tables, said means for supporting said bases of said tables comprising separable knock-down leg units insertable for storage and transport through the corresponding open ends of the bases of the nested saw table and inverted back-up table, said nested tables defining a tunnel-like chamber bounded at the top by the saw table top and at the bottom by the inverted back-up table top and at the sides by the sides of said table bases so as to provide an enclosed storage compartment for said leg units.

7. The apparatus of claim 1, including threaded studs fixed pendently to the underside of the top of said saw table at opposite side edges of said base plate of said portable circular saw and clips having slots through which said studs extend, each said clip overlapping said base plate of said portable circular saw at one end thereof and bearing at its other end against the underside of said top of said table, and nuts threaded on said studs and tightenable to cause said clips to urge said base plate of said portable circular saw upward fixedly against the underside of said top of said saw table.

8. The apparatus of claim 1, in which said saw table top has depending substantially L-cross section flanges along the front and rear edges thereof, at least one forward-rearward extending slot opening through the thickness of the saw table top and extending the full forward-rearward extent thereof, said slot extending part way down into said rear flanges, an upward opening channel cross section trough of inside width equal to the inside width of said slot and having longitudinal edge portions fixed to the underside of said saw table top on opposite sides of said slot, said trough being aligned with said slot and forming a depressed bottom closure therefor, said aligned slot and trough forming a forward-rearward guideway for a crosscut guide of the kind having a cross head for forwarding stock to be crosscut to said saw blade and a rail supporting said cross head and longitudinally received in said slot and trough for guidance therealong.

9. The apparatus of claim 1, in which said saw table includes depending, substantially L-cross section front and rear flanges at the front and rear edges thereof, said L-cross section flanges including a vertical lip depending from the top of said table and a horizontal lip extending inward of the base at the lower edge of said vertical lip; and a rip fence including a hollow rectangular cross section fence member of upwardly elongated cross section, said fence member being formed by two opposed C-cross section members having overlapped top flanges, spaced opposed upstanding bight walls, and horizontally opposed, relatively narrow bottom flanges adapted to rest on the top of said saw table and extending the full forward-rearward extent thereof, said bight walls and top flanges extending beyond the front and rear edges of said saw table and forming deep, downward opening channels, upstanding front and rear bars having upper end portions received and fixed in said downward opening channels and extending down along the front and rear flanges respectively of the saw table top, and a hand screw threaded rearwardly through the front bar to abut the front flange of said saw table top and thereby selectively fixing said fence on said saw table top by gripping of the saw table flanges between the rear bar and rear end of said hand screw.

10. The apparatus of claim 1, in which each said table top has L-cross section front and rear flanges each with a depending lip and reversely bent lip at the bottom of the latter, said table tops each having a depending end flange at each end thereof, said table bases each comprising angle cross section legs depending from the corners of said top within and fixed to said flanges, four corner legs and a pair of additional angle cross section legs substantially centrally positioned along the front and rear edges of the table top and dependent therefrom, said bases each further including a pair of horizontal angle cross section members disposed beneath the front and rear edges respectively of the table top to which are fixed the bottoms of the corresponding legs, said legs and horizontal member defining each side of the corresponding said table, said saw table further including a forward-rearwardly extending horizontal angle member on each end thereof and connecting the bottoms of the corresponding corner legs.

11. The apparatus of claim 1, in which said means for supporting said bases of said tables comprise a pair of knock-down saw horses each comprising an on-edge timber of length exceeding the combined forward-rearward extent of the tops of said saw and back-up tables, each of said timbers being supported at each end by a knock-down A-frame leg pair separable therefrom for storage.

* * * * *